COLINEAR DOUBLE CHANNEL MAGNETIC RECORDER AND REPRODUCER HEAD

Filed April 19, 1957 2 Sheets-Sheet 1

INVENTOR.
William D. Moehring
Charles F. Murphy
BY Otto A. Earl
ATTORNEY.

COLINEAR DOUBLE CHANNEL MAGNETIC RECORDER AND REPRODUCER HEAD

Filed April 19, 1957 2 Sheets-Sheet 2

INVENTOR.
William D. Moehring
Charles F. Murphy
BY [signature]
ATTORNEY.

United States Patent Office 2,931,864

Patented Apr. 5, 1960

2,931,864

COLINEAR DOUBLE CHANNEL MAGNETIC RECORDER AND REPRODUCER HEAD

William D. Moehring and Charles F. Murphy, Vermontville, Mich., assignors to Michigan Magnetics, Inc., Vermontville, Mich.

Application April 19, 1957, Serial No. 653,951

7 Claims. (Cl. 179—100.2)

This invention relates to improvements in colinear double channel magnetic recorder and reproducer head. The principal objects of this invention are:

First, to provide a double channel head in which the cores, coils and gaps of the cores are effectively insulated from each other but are close enough together to simultaneously coact with standard widths of a standard magnetic recorder tape.

Second, to provide a double channel head in which the core pieces and gaps are inexpensively held and formed in an extremely high degree of colinearity.

Third, to provide a novel form of magnetic core which permits two cores and coils to be positioned in close proximity without sacrificing space for the coils that coact with the cores.

Fourth, to provide a multi-channel magnetic head that creates a minimum of attenuation or cross talk between the channels.

Other objects and advantages of the invention will be apparent from a consideration of the following description and claims. The drawings of which there are two sheets illustrate a highly practical form of the invention.

Figures 1, 2, 3:
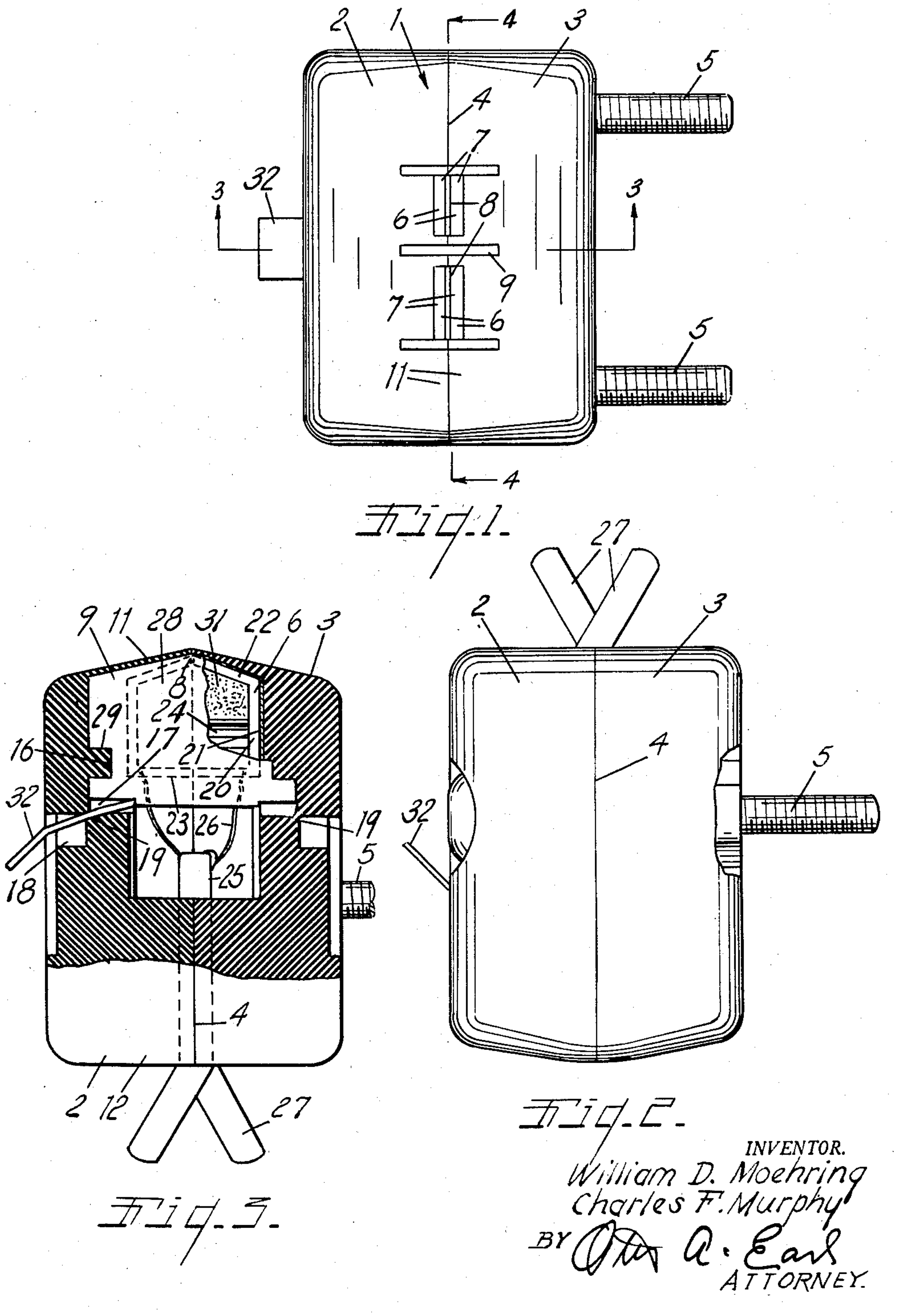
Fig. 1 is a front elevational view of a head embodying the invention.
Fig. 2 is a top plan view of the head shown in Fig. 1.
Fig. 3 is a transverse cross-sectional view through the head of the invention prior to the final grinding operation that exposes the cores and gaps. The view is taken along a plane corresponding to the plane of the line 3—3 in Fig. 1.

The head of this invention constitutes an improvement and multiple adoption of the features of a magnetic head shown in our co-pending application for Magnetic Head For Recorder And Reproducer, Serial Number 467,449, filed November 8, 1954.

The head is assembled in a molded plastic case 1 having opposed and mating halves or parts 2 and 3. For economy in production the parts 2 and 3 are desirably identical and formed in identical molds so that one part can be reversed and registered with another to form the full case but this is not necessary. The parts 2 and 3 meet along a central parting plane indicated at 4. For the purpose of orienting the parts of the head the face shown in Fig. 1 will be referred to as the front and the face shown in Fig. 2 will be referred to as the top. The opposed abutting faces of the parts will be designated as the inner surfaces of the parts. The two parts are held together by bolts 5.

The case contains two pairs generally U-shaped cores 6 with one pair in each part of the case. The cores project through the front wall of the finished case in pole tips 7 and the cores of one part meet the exposed ends of the cores in the other part to form very narrow or thin gaps 8. Two core pieces in each part of the case are separated by a shield plate 9 that extends between the two parts of the case and has its edge exposed through the front wall of the case between the gaps.

Figure 8:
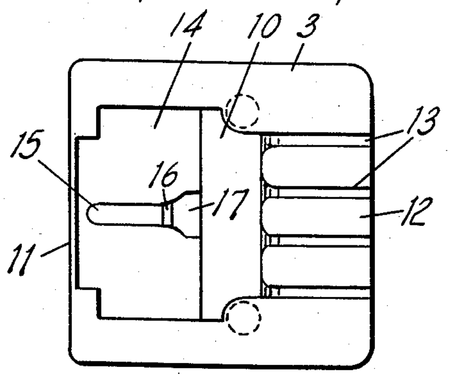
Fig. 8 is an elevational view of the inner side of one of the molded halves of the case in which the head is assembled.

As appears most clearly in Fig. 8, the case parts 3 are generally rectangular blocks with recesses 10 formed in their parting faces. The front wall 11 of the case is relatively thin while the rear wall 12 is relatively thick and has four grooves 13 formed therein from the back of the case to the recess 10. The bottom of the front part of the recesses 10 is further recessed in a shallow rectangular pocket 14 with a groove 15 extending from the front to the rear thereof. A rib 16 extends across the rear of the groove and separates the groove from a small depression 17. The depression 17 extends almost through the side wall of the case and coacts with a depression 18 (see Fig. 3) in the outer surface of the case to define a thin partition 19 in the center of the side wall.

Figure 7:
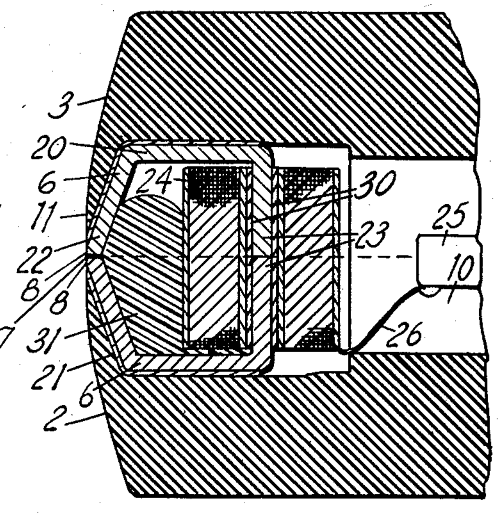
Fig. 7 is an enlarged, fragmentary cross-sectional view taken along the plane of the line 7—7 in Fig. 4.

The sides of the shallow pocket 14 on each side of the groove 15 form seats for the bases 20 of the generally U-shaped core pieces 6 that are secured thereto by adhesive 21 as is shown in exaggerated scale in Fig. 7. Two core pieces are secured to each of the case parts 2 and 3 with the forward arms 22 of the core pieces lapped along the thin front walls 11 of the case and the rear arms 23 projecting into recesses 10. An alternative method of assembly would be to mold the core pieces into the case parts in corresponding positions as is disclosed in the above mentioned copending application.

After the core pieces 6 are secured in the case parts, either by adhesive or by molding, the parting surfaces or inner surfaces 4 are ground to a high degree of flatness. The exposed ends of the core piece arms are ground at the same time so as to be exactly co-planar with the parting faces. Colinearity and straightness of the faces is held to .000005 inch. The parts are then ready for the assembly of the other parts of the head.

Figure 4:
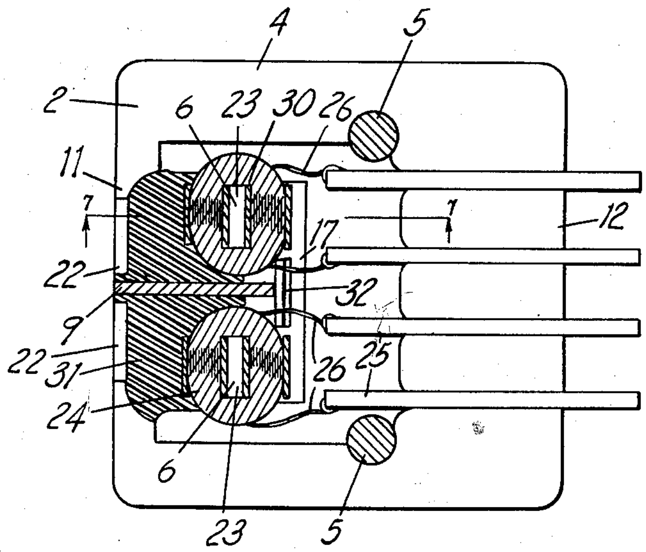
Fig. 4 is a vertical cross-section taken along the plane of the line 4—4 in Fig. 1.

One case part, say the part 2, is laid on its back with the recess 10 upward as shown in Figs. 4 and 7. Electric coils 24 are slipped over the upstanding inner arms 23 of the two core pieces. Relatively stiff lead wires or terminal strips 25 are laid in the grooves 13 and connected to the ends 26 of the coils. The outer ends 27 of the terminal strips may be angled alternately oppositely to increase their spacing and facilitate making connections thereto. The metallic shield plate 9 is inserted edgewise between the coils 24 into the groove 15. A notch 29 in the edge of the plate fits over the rib 16 (see Fig. 3) and locates the plate. The front edge of the shield plate is pointed or triangular as at 28 and fits tightly against the thin front wall 11 of the case.

The coils 24 and the shield plate 9 project above the parting surface 4 of the case part and magnetic bridge strips 30 may be inserted in the coils and alongside of the inner arms 23 of the core pieces to project above the lower core pieces. A mass 31 of thermosetting plastic material is deposited between the forward sides of the coils and the shield plate and the second case part 3 is placed over the first part with the ends of the inner arms of its core pieces projecting into the tops of the coils and between the bridge strips 31. The upper edge of the shield plate fits into the groove 15 provided therefor in the upper case part and bolts 5 are inserted through holes molded or drilled in the case parts to hold the case together.

One of the thin partitions 19 is punched out and a springable ground plate 32 is inserted therethrough into electrical contact with the rear or inner edge of the shield plate (see Fig. 3). The assembled parts are then baked or heated to set the thermoplastic material 31 and the forward face of the assembled case is ground off in a hyperbolic surface to expose the tips 7 of the front arms 22 of the core pieces 20 and the forward edge of the shield plate 9.

Figure 5:
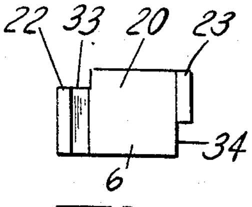
Fig. 5 is a side elevational view of the core piece.
Figure 6:
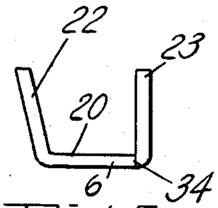
Fig. 6 is a plan view of one of the magnetic core pieces used in the head.

In order that the pole tips 7 and gaps 8 of the cores may be the standard length of .093 inch adopted by the industry and still close enough together to lay within the width of a standard magnetic tape and still leave room for the coils 24 around their inner arms, the core pieces 20 are shaped as shown in Figs. 5 and 6. The outer edges of the front arms are notched or cut away as at 33 and the inner edges of the rear arms 23 are notched or cut away as at 34. The front arms 22 can thus be positioned closely adjacent the shield plate 9 and be of proper width while the rear arms 23 are of the same width but spaced substantially from the shield plate to leave room for coils of normal thickness.

The head and its parts are relatively easily assembled to a high degree of accuracy and two operating channels are provided within the width of a standard tape. Interference or cross talk between the channels is reduced to a minimum by the grounded shield plate. It will be understood that while the rear arms 23 of the core pieces are abutted between the two halves of the case, a very thin gap too small to illustrate is maintained between the opposed front arms 22. This gap is maintained at a width of the order of .0002 inch.

Having thus described the invention, what is claimed to be new and what is desired to be secured by Letters Patent is:

1. A dual coil magnetic pickup head for bi-naural operation of tape recorders comprising a moulded plastic case of two concentric halves secured together along a central parting plane, said halves defining opposed recesses with a thin front wall, further recessed pockets formed in the bottoms of said recesses with grooves extending from front to rear of the pockets and with ribs extending across said grooves, a pair of magnetizable core pieces of U-shape positioned in each half of the case on each side of said grooves and within said pockets, the front arms of said cores being inclined forwardly and projecting through the front wall of the case at the parting plane thereof, the rear arms of said cores projecting into abutting coacting relation with the opposed cores in the other half of the case, two electrical coils positioned telescopically around the rear arms of said cores with each coil embracing the rear arms of two opposed cores, a shield plate of magnetic metal disposed between said coils and said cores perpendicular to the parting plane of the case with its opposite edges received in said grooves in said pockets and having notches embracing said ribs, the forward edge of said plate projecting through the forward wall of said case, a mass of solidified plastic material filling that portion of said recesses between said coils and said plate and the forward arms of said cores, said cores being notched at the adjacent inner corners and at the opposite outer corners whereby the width of the inner arms of the cores is reduced and the spacing therebetween is increased and whereby the width of the outer arms is reduced and the combined width thereof is reduced relative to the width of the base of the cores, the meeting surfaces of said halves and the opposed edges of said cores being accurately ground into plane surfaces, and means forming a bond holding said cores in said halves while said plane surfaces are ground and prior to assembly of the other elements in the case.

2. A dual coil magnetic pickup head for bi-naural operation of tape recorders comprising a moulded plastic case of two mating parts secured together along a central parting plane, said parts defining opposed recesses with a thin front wall, further recessed pockets formed in the bottoms of said recesses with grooves extending from front to rear of the pockets and with ribs extending across said grooves, a pair of magnetizable core pieces of U-shape positioned in each part of the case on each side of said grooves and within said pockets, the front arms of said cores being inclined forwardly and projecting through the front wall of the case at the parting plane threof, the rear arms of said cores projecting into abutting coacting relation with the opposed cores in the other half of the case, magnetic bridging strips lapped along the rear arms of said cores and extending across the joint between the cores in the two parts of the case, two electrical coils positioned telescopically around the rear arms of said cores with each coil embracing the rear arms of two opposed cores, a shield plate of metal disposed between said coils and said cores perpendicular to the parting plane of the case with its opposite edges received in said grooves in said pockets and having notches embracing said ribs, the forward edge of said plate projecting through the forward wall of said case, a mass of thermal setting plastic material filling that portion of said recesses between said coils and said plate and the forward arms of said cores, said cores being notched at the adjacent inner corners and at the opposite outer corners whereby the width of the inner arms of the cores is reduced and the spacing therebetween is increased and whereby the width of the outer arms is reduced and the combined width thereof is reduced relative to the width of the base of the cores, one part of said case having a slit formed through the bottom of the recess therein adjacent the inner edge of said shield, and a springable metallic strip extending through said slot into contact with said shield and angularly outwardly through the case to form a ground connection to the shield, and a layer of adhesive holding said cores in said parts.

3. A dual coil magnetic pickup head for bi-naural operation of tape recorders comprising a moulded plastic case of two mating parts secured together along a central parting plane, said parts defining opposed recesses with a thin front wall, a pair of magnetizable core pieces of U-shape positioned in each part of the case and within said recesses, the front arms of said cores being inclined forwardly and projecting through the front wall of the case at the parting plane thereof, the rear arms of said cores projecting into abutting coacting relation with the opposed cores in the other half of the case, magnetic bridging strips lapped along the rear arms of said cores and extending across the joint between the cores in the two parts of the case, two electrical coils positioned telescopically around the rear arms of said cores, a mass of plastic material positioned in that portion of said recesses between said coils and the forward arms of said cores, said cores being notched at the adjacent inner corners and at the opposite outer corners whereby the width of the inner arms of the cores is reduced and the spacing therebetween is increased and whereby the width of the outer arms is reduced and the combined width thereof is reduced relative to the width of the bases of the cores, the meeting surfaces of said parts and the opposed edges of said cores being accurately ground into plane surfaces coinciding with the parting plane of the case, and means holding said cores in said parts while said plane surfaces are ground and prior to assembly of the other elements in the case.

4. A dual coil magnetic pickup head for tape recorders comprising a case of two mating parts secured together along a parting plane, one of said parts defining a recess with a thin front wall and opening to said plane, a pair of magnetizable core pieces positioned in each part of the case, one pair of core pieces being of U-shape and located in outwardly facing relation in said recess, the front arms of said U-shaped cores being inclined forwardly and projecting through the front wall of the case at the parting plane thereof, the front ends of the other cores projecting through the front wall of the case, the ends of said U-shaped cores projecting into abutting coacting relation with the opposed cores in the other part of the case, two electrical coils positioned telescopically around the rear arms of said U-shaped cores, and a mass of solidified plastic material filling that portion of said recess between said coils and the forward arms of said cores, said U-shaped cores being notched at the adjacent inner corners and at the opposite outer corners whereby the width of the inner arms of the cores is reduced and the spacing therebetween is increased and whereby the width of the outer arms is reduced and the combined width thereof is reduced relative to the width of the base of the cores, the meeting surfaces of said parts and the opposed edges of said cores being accurately ground into plane surfaces coinciding with the parting plane of the case.

5. A dual coil magnetic pickup head for tape recorders comprising a case of two mating parts secured together along a parting plane, one of said parts defining a recess with a thin front wall and opening to said plane, a pair of magnetizable core pieces positioned in each part of the case, one pair of core pieces being of U-shape and located in outwardly facing relation in said recess, the front arms of said U-shaped cores projecting through the front wall of the case at the parting plane thereof, the front ends of the other cores projecting through the front wall of the case, the ends of said U-shaped cores projecting into abutting coacting relation with the opposed cores in the other part of the case, and two electrical coils positioned telescopically around the rear arms of said U-shaped cores, said U-shaped cores being notched at the adjacent inner corners and at the opposite outer corners whereby the width of the inner arms of the cores is reduced and the spacing therebetween is increased and whereby the width of the outer arms is reduced and the combined width thereof is reduced relative to the width of the base of the cores, the meeting surfaces of said parts and the opposed edges of said cores being accurately ground into plane surfaces coinciding with the parting plane of the case.

6. In a magnetic pickup head having dual coils and magnetic cores therefor with the cores projecting to the surface of the head, a core piece for forming part of said cores comprising a generally U-shaped piece of magnetic iron with a rear arm generally perpendicular to the base of the piece and with a front arm inclined outwardly from the base of the piece, the rear arm being cut away along one edge so as to be narrower than the base, and the front arm of the piece being cut away on the diagonally opposite edge from the cut away edge of the rear arm.

7. In a magnetic pickup head having dual coils and magnetic cores therefor with the cores projecting to the surface of the head, a core piece for forming part of said cores comprising a generally U-shaped piece of magnetic iron with front and rear arms, the rear arm being generally perpendicular to the base of the piece, the rear arm being cut away along one edge so as to be narrower than the base, and the front arm of the piece being cut away on the diagonally opposite edge from the cut away edge of the rear arm.

References Cited in the file of this patent

UNITED STATES PATENTS

| | | |
|---|---|---|
| 2,413,108 | Latchford et al. | Dec. 24, 1946 |
| 2,563,445 | Zenner | Aug. 7, 1951 |
| 2,668,878 | Munroe | Feb. 9, 1954 |
| 2,756,280 | Rettinger | July 24, 1956 |
| 2,769,866 | Kornei | Nov. 6, 1956 |
| 2,800,534 | Bradford et al. | July 23, 1957 |

FOREIGN PATENTS

| | | |
|---|---|---|
| 884,881 | France | May 10, 1943 |
| 1,055,860 | France | Oct. 21, 1953 |
| 1,112,823 | France | Nov. 23, 1955 |
| 1,113,815 | France | Dec. 12, 1955 |